US010035720B2

United States Patent
Sugawara (10) Patent No.: US 10,035,720 B2
(45) Date of Patent: Jul. 31, 2018

(54) SLUDGE CONDENSING MACHINE (71) Applicant: Metawater Co., Ltd., Tokyo (JP)

(72) Inventor: Yoshiyuki Sugawara, Tokyo (JP)

(73) Assignee: Metawater Co., Ltd., Chiyoda-Ku (JP)

( * ) Notice: Subject to any disclaimer, the term of this patent is extended or adjusted under 35 U.S.C. 154(b) by 186 days.

(21) Appl. No.: 14/472,597

(22) Filed: Aug. 29, 2014

(65) Prior Publication Data

US 2014/0367320 A1 Dec. 18, 2014

Related U.S. Application Data (63) Continuation of application No. PCT/JP2013/055224, filed on Feb. 27, 2013.

(30) Foreign Application Priority Data

Mar. 2, 2012 (JP) ................. 2012-046908

(51) Int. Cl.
  *B01D 33/58* (2006.01)
  *C02F 11/12* (2006.01)
  *B01D 33/04* (2006.01)
  *C02F 11/14* (2006.01)

(52) U.S. Cl.
  CPC ............ *C02F 11/123* (2013.01); *B01D 33/04* (2013.01); *B01D 33/58* (2013.01); *C02F 11/125* (2013.01); *C02F 11/14* (2013.01)

(58) Field of Classification Search
  CPC .... B01D 29/6484; B01D 29/94; B01D 33/04; B01D 33/37; B01D 33/466; B01D 33/58; B01D 33/76; B01D 37/03; C02F 11/121; C02F 11/123; C02F 11/125; C02F 11/14; F26B 17/20; F26B 17/205
  See application file for complete search history.

(56) References Cited

U.S. PATENT DOCUMENTS

| | | | |
|---|---|---|---|
| 4,354,935 A | 10/1982 | Austin et al. | |
| 4,602,998 A | 7/1986 | Goron | |
| 4,609,467 A | 9/1986 | Morales | |
| 5,560,834 A * | 10/1996 | Gold ............... | B01D 33/04 210/386 |
| 5,885,445 A | 3/1999 | Andrews et al. | |

(Continued)

FOREIGN PATENT DOCUMENTS

| | | |
|---|---|---|
| GB | 2 048 845 A | 12/1980 |
| GB | 2 233 247 A | 1/1991 |

(Continued)

OTHER PUBLICATIONS

JPS60151696U—Applicant Submitted Translation, 2014, 8 pages.*

(Continued)

*Primary Examiner* — Patrick J Orme
(74) *Attorney, Agent, or Firm* — Burr & Brown, PLLC (57) ABSTRACT

A sludge condensing machine includes: a gravity filtration section conducting a gravity filtering to a sludge while conveying the sludge on an upper surface of a filtration body, and a movement mechanism, disposed at a downstream side of a sludge insertion position of the gravity filtration section, for reducing a dimension of the sludge in a width direction on the filtration body by moving the sludge in a direction intersecting a conveying direction that the sludge is conveyed by the filtration body.

8 Claims, 5 Drawing Sheets

(56) References Cited

U.S. PATENT DOCUMENTS

| | | | |
|---|---|---|---|
| 2005/0000908 A1* | 1/2005 | Karlsson | C02F 1/722 |
| | | | 210/722 |
| 2009/0000752 A1* | 1/2009 | Dykstra | C02F 11/14 |
| | | | 162/175 |
| 2009/0065448 A1* | 3/2009 | Schedler | C02F 11/125 |
| | | | 210/770 |
| 2011/0132831 A1 | 6/2011 | Marsh | |
| 2015/0251940 A1* | 9/2015 | Sugawara | B01D 33/58 |
| | | | 210/96.1 |

FOREIGN PATENT DOCUMENTS

| | | | | |
|---|---|---|---|---|
| JP | 56-105714 A1 | 8/1981 | | |
| JP | 59-059229 A1 | 4/1984 | | |
| JP | 60-146596 | 9/1985 | | |
| JP | 60-191697 A1 | 9/1985 | | |
| JP | 60-151696 | 10/1985 | | |
| JP | 60151696 U | * 10/1985 | | B01D 33/04 |
| JP | 62-001418 A1 | 1/1987 | | |
| JP | 62-033512 A1 | 2/1987 | | |
| JP | 63-080998 A1 | 4/1988 | | |
| JP | 02-038192 | 3/1990 | | |
| JP | 06-234099 A1 | 8/1994 | | |
| JP | 2000-093712 A | 4/2000 | | |
| JP | 2005-028296 A1 | 2/2005 | | |
| JP | 2005-034796 A1 | 2/2005 | | |
| JP | 2010-094637 A1 | 4/2010 | | |
| JP | 2012-091129 A1 | 5/2012 | | |
| WO | 01/56681 A1 | 8/2001 | | |

OTHER PUBLICATIONS

Extended European Search Report (Application No. 13755856.5) dated Nov. 4, 2015.
International Search Report and Written Opinion (With English Translation), International Application No. PCT/JP2013/055224, dated Mar. 26, 2013 (14 pages).
Japanese Decision of a Patent Grant (Application No. 2012-046908) dated Dec. 8, 2015 (with English translation).

* cited by examiner

SLUDGE CONDENSING MACHINE

CROSS-REFERENCE TO RELATED APPLICATIONS

This application is a continuation of PCT International Application No. PCT/JP2013/055224 filed on Feb. 27, 2013 which claims the benefit of priority from Japanese Patent Application No. 2012-046908 filed on Mar. 2, 2012, the entire contents of which are incorporated herein by reference.

BACKGROUND OF THE INVENTION

1. Field of the Invention

The present invention relates to a sludge condensing machine including a gravity filtration section conducting a gravity filtering while conveying a sludge on an upper surface of a filtration body.

2. Description of the Related Art

Conventionally, a sludge condensing machine has been made use of, which concentrates a sludge such as a sewage or industrial wastewater etc. to be treated, by subjecting the sludge to a gravity filtering to reduce a water content contained in the sludge while conveying the sludge on an upper surface of an endless filtration cloth belt turning around. Although such a sludge condensing machine is usually used for improving an efficiency of a digestion tank or a dehydrator at a rear stage thereof by concentrating the sludge to a condensation concentration of 4 to 5%, there is a problem of a low dehydration efficiency and a slow filtration rate by merely conducting a gravity filtering of the sludge on the filtration body such as a filtration cloth belt etc.

Japanese Laid-open Patent Publication No. 2000-93712 discloses a configuration in which a V-shaped sludge divider and a resisting member reducing a flowing speed and a thickness of a sludge on an upper portion of a gravity filtration section of a belt press dehydrator in an attempt to improve a dehydration efficiency and drainage of the filtration cloth.

SUMMARY OF THE INVENTION

A sludge condensing machine according to the present invention includes: a gravity filtration section conducting a gravity filtering to a sludge while conveying the sludge on an upper surface of a filtration body; and a movement mechanism, disposed at a downstream side of a sludge insertion position of the gravity filtration section, for reducing a dimension of the sludge in a width direction on the filtration body by moving the sludge in a direction intersecting a conveying direction that the sludge is conveyed by the filtration body.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a sludge condensing machine according to the present invention will be mentioned and described in detail with reference to the drawings.

Although, as described above, the conventional sludge condensing machine attempts to improve its dehydration efficiency by providing an obstacle on the filtration body of the gravity filtration section to separate the sludge being conveyed, it is difficult to improve the efficiency of concentrating the sludge to a great extent by providing a mere obstacle on the filtration body. It is preferable that a sludge condensing machine is capable of concentrating a sludge to a higher concentration for improving a dehydration efficiency of a digestion tank or a dehydrator provided at a rear stage of the sludge condensing machine.

In contrast, according to the embodiment described below, it is possible to provide an advantage that a sludge condensing machine capable of concentrating a sludge efficiently and improving a condensation concentration.

Figure 1:
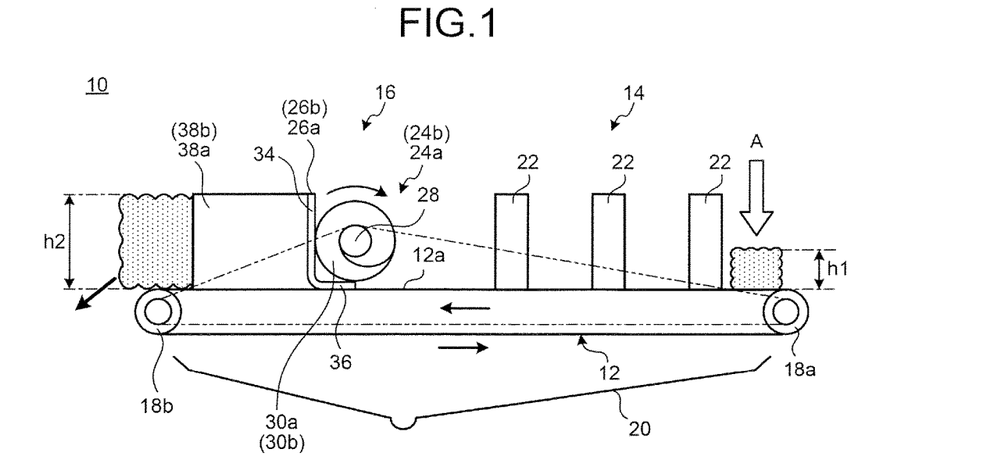
FIG. 1 is a side view illustrating a configuration of a sludge condensing machine according to a first embodiment of the present invention.
Figure 2:
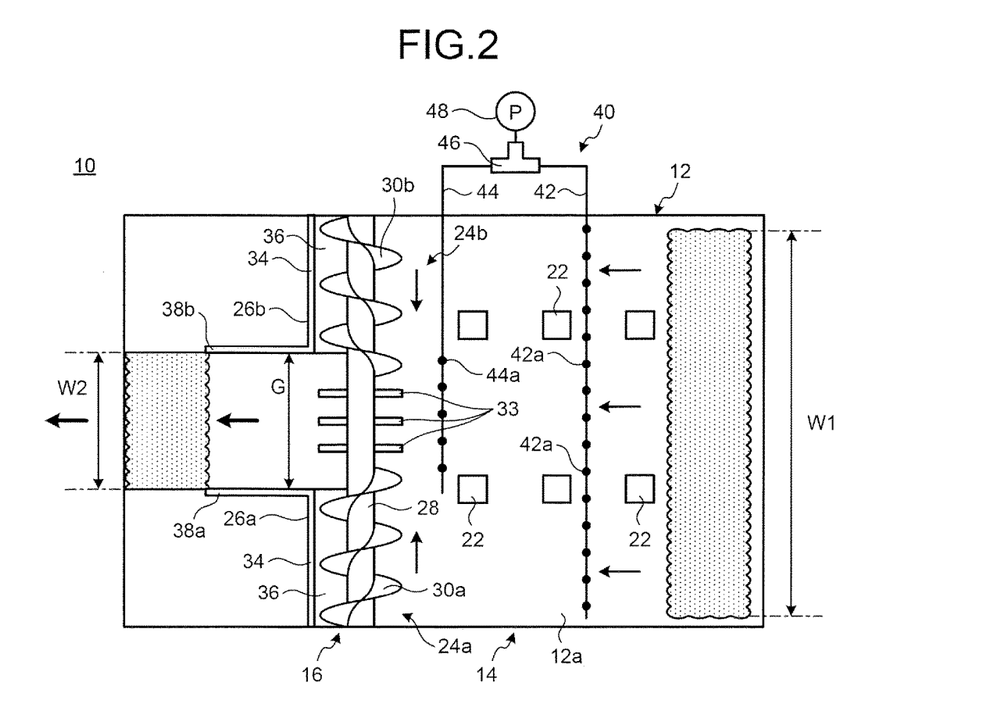
FIG. 2 is a plan view illustrating the configuration of the sludge condensing machine illustrated in FIG. 1.

FIG. 1 is a side view illustrating a configuration of a sludge condensing machine 10 according to a first embodiment of the present invention. FIG. 2 is a plan view illustrating the configuration of the sludge condensing machine 10 illustrated in FIG. 1. The sludge condensing machine 10 according to the present embodiment is a device which conducts a gravity filtering while conveying a sludge (for example, sewage sludge) on an upper surface of an endlessly configured filtration body 12 and feeds the concentrated sludge. The sludge condensing machine 10 can be used not only as a concentrating apparatus but also as a dehydrator.

As illustrated in FIGS. 1 and 2, the sludge condensing machine 10 is configured to include a gravity filtration section 14 conducting a gravity filtering (gravity concentration) of a sludge on an upper surface 12a of the filtration body 12 travelling as a non-end track (endless track). A movement mechanism 16 moving the sludge in a direction perpendicular to a conveying direction by the filtration body 12 is provided at a downstream side of a sludge introduction position A of the gravity filtration section 14.

The gravity filtration section 14 is configured by an upper surface (outer periphery) 12a of the endless filtration body 12 wound to a plurality of rollers (roll) 18a and 18b and driven to be circled in one direction. The gravity filtration section 14 is a means of filtering and separating a water content contained in a sludge by gravity when the sludge is disposed on the upper surface 12a of the filtration body 12 stretched between the rollers 18a and 18b.

The filtration body 12 is configured by, for example, an elongated and belt-shaped filtration cloth belt having a water permeability or an elongated and belt-shaped metal screen etc. in which a plurality of net-like micro pore potions are formed. The filtration body 12 is wound on each of the rollers 18a and 18b with a sufficient tension and is capable of travelling, by a driving power source such as a motor etc. not illustrated in the drawings, in a direction indicated by an arrow illustrated in FIG. 1 (i.e., a counter clockwise direction in FIG. 1). In FIGS. 1 and 2, the conveying direction of the sludge is indicated by a direction from a right side (upstream side) to a left side (downstream side). Therefore, while the sludge introduced to, and disposed at, the sludge introduction position A at an upstream side is conveyed by the filtration body 12 to a downstream side, only a water content passes through the filtration body 12 by gravity to be filtrated and dehydrated. The filtrated water content (separated liquid, filtrate) is collected by a filtrate tray 20.

A plurality of (six in the present embodiment) bars 22 are disposed to stand on the upper surface 12a of the filtration body 12 constituting the gravity filtration section 14. The bars 22 are obstacles making contact with the sludge conveyed on the filtration body 12 to disperse the sludge and promote drainage thereof. The bars 22 may be modified in position to be installed, quantity, or shape to be formed.

The movement mechanism 16 provided at the downstream side of such gravity filtration section 14 is an apparatus of enhancing the concentration of a sludge by reducing the width direction of the sludge conveyed on the filtration body 12 and simultaneously consolidating the sludge by increasing the sludge in height to improve its filtration efficiency.

The movement mechanism (screw conveyor) 16 has an opening toward the entire upstream side of the upper surface 12a of the filtration body 12 to be capable of receive the sludge. The movement mechanism 16 includes a pair of screws 24a and 24b moving the sludge in a direction intersecting the convey direction by the filtration body 12 (in the perpendicular direction in FIG. 2) and a pair of guide plates 26a and 26b disposed in proximity to the downstream sides of the screws 24a and 24b and standing at both sides in the width direction of the filtration body 12. A gap G between the guide plates 26a and 26b (substantially the same as a gap between the screws 24a and 24b) serves as a path through which the sludge is discharged from the movement mechanism 16 to the downstream side.

The screws 24a and 24b include a screw shaft 28 and screw blades 30a and 30b. The screw shaft 28 extends in a direction perpendicular to the conveying direction of the sludge by the filtration body 12 and crossing over the width direction of the filtration body 12. The screw blades 30a and 30b are provided spirally on two sides of outer peripheries of the screw shaft 28 but not provided in a proximity of a central portion of the screw shaft 28.

Two side portions of the screw shaft 28 are axially supported, by bearings not illustrated in the drawings, at positions outside in the width direction of the filtration body 12, and is capable of rotating along with the travelling filtration body 12 being driven by, for example, linking the rollers 18a and 18b, on which the filtration body 12 is wound, and the screw shaft 28 by a flexible power transmission member such as a chain or a belt etc. (see a chain double-dashed line in FIG. 1). In the configuration of synchronizing a movement of the travelling filtration body 12 and a movement of the rotating screw shaft 28, a setting and a control of the relationship between a convey speed of the sludge by the filtration body 12 and a rotation speed of the screw shaft 28 (i.e., the speed of the sludge moved by the screws 24a and 24b) are facilitated by appropriately designing a diameter of each shaft on which the flexible power transmission member is wound or providing a speed reducing unit etc. not illustrated in the drawings allow. Of course, a driving power source such as a motor etc. independently driving and rotating the screw shaft 28 may be provided.

The top ends of the screw blades 30a and 30b of the respective screws 24a and 24b face each other with a gap which is similar to gap G at positions in proximity to the lateral sides in the width direction of the filtration body 12. The screw blades 30a and 30b are provided on outer peripheries of the screw shaft 28. The directions of spirals of the respective screw blades 30a and 30b are symmetric (opposite) with respect to a center line of the filtration body 12, and the directions in which the sludges are moved by the screws 24a and 24b respectively are set opposite to each other. Therefore, each of the screws 24a and 24b moves the sludges from outsides to inside (center) in the width direction of the filtration body 12, and thus the sludges moved from the outsides are pressed against each other to be consolidated in a center portion at which their top ends are separated with the gap described above. Of course, instead of the configuration in which both the screws 24a and 24b share the screw shaft 28, a configuration using screw shafts separately may be used.

Provided at the center portion of the screw shaft 28, i.e., an outer periphery of the screw shaft 28 exposed between the screws 24a and 24b are a plurality of paddles 33 (three pieces in FIG. 2) discharging a sludge conveyed at a center side in the width direction of the filtration body 12 and a sludge consolidated at a center by a pair of the screws 24a and 24b to a downstream side smoothly. The paddles 33 are, for example, several impellers as a set provided on the outer periphery of the screw shaft 28 along a circumference direction.

The guide plates 26a and 26b have wall portions 34 and bottom portions 36. The wall portions 34 stand at positions in proximity with the screws 24a and 24b at downstream sides of the screws 24a and 24b. The bottom portions 36 are formed by bending lower ends of the wall portions 34 to protrude toward their upstream sides in the conveying direction of the sludge by the filtration body 12 to cover approximate halves of the screws 24a and 24b below the screws 24a and 24b. Provided at center sides' ends of the respective guide plates 26a and 26b are a pair of passage plates 38a and 38b extending to downstream sides along the convey direction of the sludge conveyed by the filtration body 12.

The wall portions 34 are plate members of which heights are set to be approximately the same as those of the screws 24a and 24b. The heights of the wall portions 34 can be varied appropriately. As illustrated in FIG. 1, the bottom portions 36 are plate members formed to protrude from lower ends of the wall portions 34 toward an upstream side in the convey direction until reaching a position of approximate centers of the screws 24a and 24b, and the lengths of the bottom portions 36 can be varied appropriately. However, if the bottom portions 36 protrude to the upstream sides too long, it is difficult to press the sludges to the screws 24a and 24b by the filtration body 12, and it turns out that the sludges are difficult to be fed into the screws 24a and 24b. Therefore, it is preferable to set the lengths of the bottom portions 36 to a degree that bottom surfaces of the screws 24a and 24b can be exposed partly to the filtration body 12. A screen etc. in which many micro pore potions are formed may be used for the wall portions 34 and the bottom portions 36 constituting the guide plates 26a and 26b.

Although the present embodiment exemplifies the configuration in which the screws 24a and 24b and the guide plates 26a and 26b are installed to move the sludges in a direction perpendicular to the conveying direction of the sludge by the filtration body 12, the screws 24a and 24b and the guide plates 26a and 26b may only have to be installed in a direction so that the sludge can be moved in a direction intersecting the conveying direction of the sludge at a predetermined angle. This is applicable to a dispersion mechanism 50 and a movement mechanism 80, which will be explained later. For example, a combination of the screw 24a and the guide plate 26a and a combination of the screw 24b and the guide plate 26b may be installed at an angle relative to the conveying direction of the sludge to form a V-letter shape or an inverted V-letter shape. In this case, screw shafts may be provided to the screws 24a and 24b respectively and independently. Alternatively, the screw shafts may be linked by a bevel gear etc.

The two passage plates 38a and 38b are disposed to stand and face with each other with a gap of which width is the same as that of the gap G formed between the screw blades 30a and 30b or between the guide plates 26a and 26b. The passage plates 38a and 38b form a path through which the sludge consolidated by the screws 24a and 24b in the vicinity of the center of the filtration body 12 is discharged to a downstream side smoothly. The passage plates 38a and 38b are set at heights that are approximately the same as that of the wall portion 34. In a practical use, the sludge consolidated by the screws 24a and 24b at the center is conveyed from the gap G between the pair of guide plates 26a and 26b (wall portion 34) to a downstream side by the travelling filtration body 12. For this reason, although the passage plates 38a and 38b may be omitted, if the passage plates 38a and 38b are provided, the sludge consolidated at the center and increased in height can be conveyed to the downstream side more smoothly.

As illustrated in FIG. 2, a chemical-feeding facility 40 may be disposed at an upstream side of the movement mechanism 16 in the gravity filtration section 14 for spraying a chemical such as an iron-based inorganic flocculant etc. to the sludge being conveyed. The chemical-feeding facility 40 includes a first tubular path 42, a second tubular path 44, and a liquid-feeding pump 48. The first tubular path 42 includes a plurality of chemical nozzles 42a disposed in the width direction of the filtration body 12 entirely in the vicinity of the sludge introduction position A. The second tubular path 44 includes a plurality of chemical nozzles 44a disposed in the width corresponding to the gap G between the screws 24a and 24b at a somewhat upstream side of the movement mechanism 16. The liquid-feeding pump 48 supplies a chemical, stored in a chemical tank not illustrated in the drawings, under control of a three-way valve 46 being switched to the first tubular path 42 and the second tubular path 44.

Since the chemical-feeding facility 40 can supply a chemical such as a flocculant etc. to the sludge being conveyed at an upstream side of the movement mechanism 16 consolidating the sludge, the sludge is mixed with the supplied chemical uniformly when the sludge is consolidated by the movement mechanism 16; therefore, it is possible to increase a coagulation efficiency by the chemical and improve an efficiency in concentrating the sludge furthermore. Although the three-way valve 46 is capable of switching between the first tubular path 42 and the second tubular path 44, there is no doubt that only one of the first tubular path 42 and the second tubular path 44 may be installed. In this case, the number of the chemical nozzles 44a of the second tubular path 44 may be fewer than those of the first tubular path 42, there are advantages that the cost therefor may be lower and a flow amount of the chemical may be controlled more easily.

An operation of the sludge condensing machine 10 configured above will be explained next.

At first, the sludge as an object to be treated and to be concentrated by the sludge condensing machine 10 is introduced, in a state in which a predetermined polymer flocculant is supplied to form a floc, from the sludge introduction position A, which is at an upstream side of the upper surface 12a of the filtration body 12, to the gravity filtration section 14. The introduced sludge is subjected to a gravity filtering (gravity dehydration) and arrives at the movement mechanism 16 while being conveyed on the travelling filtration body 12 and being subjected to an act, by the bars 22, of promoting drainage on the way.

In the movement mechanism 16, the sludges conveyed on two lateral sides in the width direction of the filtration body 12 are caught in each of the rotating screws 24a and 24b and move while being guided by the guide plates 26a and 26b and being pressed toward the center portion. The sludges moved by the screws 24a and 24b are mixed with a sludge conveyed on the center portion (central portion) and not caught by the screws 24a and 24b, and simultaneously pressed against with each other to be consolidated at the center portion of the filtration body 12 by extrusion forces exerted by the respective screws 24a and 24b. The sludge thus consolidated in a state of being reduced in dimension in the width direction and being increased in height is discharged from the gap G through a path between the passage plates 38a and 38b to a downstream side by a rotation force of the paddles 33, and on this occasion, the sludge continues to be subjected to a gravity filtering by the filtration body 12 to be concentrated to a desirable concentration.

For example, since the sludge with a dimension of width W1 being extended in the width direction of the filtration body 12 and with a height h1 introduced at the sludge introduction position A is reduced to a width W2 which is narrower than the width W1 when the sludge is discharged from the movement mechanism 16, the sludge increases in a height direction to a height h2 by a surface area reduced in its plan view, thus, the sludge is in a sufficiently consolidated state. Therefore, a condensation concentration of the sludge increases to a greater extent than in a case of being subjected to a mere gravity filtering. In addition, since the height of the sludge increases at a downstream side of the movement mechanism 16, its deadweight improves an efficiency of gravity filtering furthermore. Therefore, even if the sludge is sufficiently dehydrated and concentrated until a timepoint that the sludge has been treated by the movement mechanism 16, it is possible to promote the concentration by the gravity filtering. In addition, since the sludge is compressed while being moved by the guide plates 26a and 26b and by rotation forces of the screw blades 30a and 30b when the screws 24a and 24b move the sludge to the center portion, the concentration of the sludge increases to a higher degree. In this occasion, a water of the sludge compressed by the screws 24a and 24b flows from the wall portion 34 to a bottom portion 36 to be filtrated by the filtration body 12.

A part of the sludge may sometimes go over the wall portions 34 of guide plates 26a and 26b at back sides of the screws 24a and 24b since all the sludge cannot be smoothly collected to the center portion by the screws 24a and 24b, due to circumstances e.g., an amount of the sludge being introduced or a relationship between a conveying speed by the filtration body 12 and a moving speed by the screws 24a and 24b etc. However, it is not a problem particularly since the sludge having gone over the guide plates 26a and 26b is further subjected to gravity filtering on the filtration body 12 at a downstream side eventually, and is finally mixed with the sludge having passed between the passage plates 38a and 38b.

As described above, the sludge condensing machine 10 according to the present embodiment includes the movement mechanism 16 being disposed at a downstream side of the sludge introduction position A of the gravity filtration section 14 and reducing a dimension of the sludge in the width direction on the filtration body 12 by moving the sludge in a direction intersecting the conveying direction of the sludge by the filtration body 12. This causes the sludge being subjected to gravity filtering while being conveyed on the filtration body 12 to be moved in the direction intersecting its convey direction, reduced in dimension in its width direction, increased in its height, and thereby consolidated. It is hereby possible to concentrate the sludge efficiently to increase its condensation concentration and generate, for example, a cake-like sludge with a high condensation concentration.

For example, although a conventional sludge condensing machine making use of gravity filtering was capable of increasing less than 1% of a condensation concentration of a sludge (a water content ratio of not lower than 99%) prior to a treatment to 4 to 5% of condensation concentration subsequent to the treatment, its concentration speed was slow and the configuration of the machine was inevitably large in size. By contrast, the sludge condensing machine 10 is capable of increasing a less than 1% of condensation concentration of sludge prior to a treatment to an approximately 5 to 15% of condensation concentration (approximately 95 to 85% of water content ratio) subsequent to the treatment, it is possible to increase its concentration speed and reduce the configuration of the machine in size by an effect of consolidation by the movement mechanism 16. In addition, since the sludge condensing machine 10 can increase a concentration rate, there is an advantage that a dehydration rate of a dehydrator increases at a rear stage.

The sludge condensing machine 10 adopts a configuration using the screws 24a and 24b extending in the direction intersecting the conveying direction of the sludge by the filtration body 12 to move the sludge by means of rotations of the screws 24a and 24b as the movement mechanism 16. This allows the sludge being conveyed by the screws 24a and 24b to be compressed, and thereby allowing its condensation concentration to be increased furthermore.

In this case, the movement mechanism 16 is provided with a pair of the screws 24a and 24b, and the screws 24a and 24b are disposed to face each other in a state where a gap is provided in the vicinity of the center in the width direction of the filtration body 12 for making the sludge pass to a downstream side. The screws 24a and 24b are set in directions so that the sludge is moved to be collected at the gap. Since this causes the sludges to be consolidated while being collected to the center by the screws 24a and 24b and being forced to compress with each other, thereby allowing its condensation concentration to be increased furthermore.

The wall portions 34 of the guide plates 26a and 26b are made to stand at positions in proximity with the screws 24a and 24b at a downstream side of the screws 24a and 24b in the conveying direction of the sludge. This allows the sludge conveyed on the filtration body 12 to be introduced to, and moved by, the screws 24a and 24b more reliably and smoothly by an effect of the guide plates 26a and 26b blocking the sludge. Since the sludges moved by the screws 24a and 24b are forced to be pressed against the guide plates 26a and 26b, it is possible to increase an effect of compression by the screws 24a and 24b.

A sludge condensing machine 10a according to a second embodiment of the present invention will be explained next.

Figure 3:
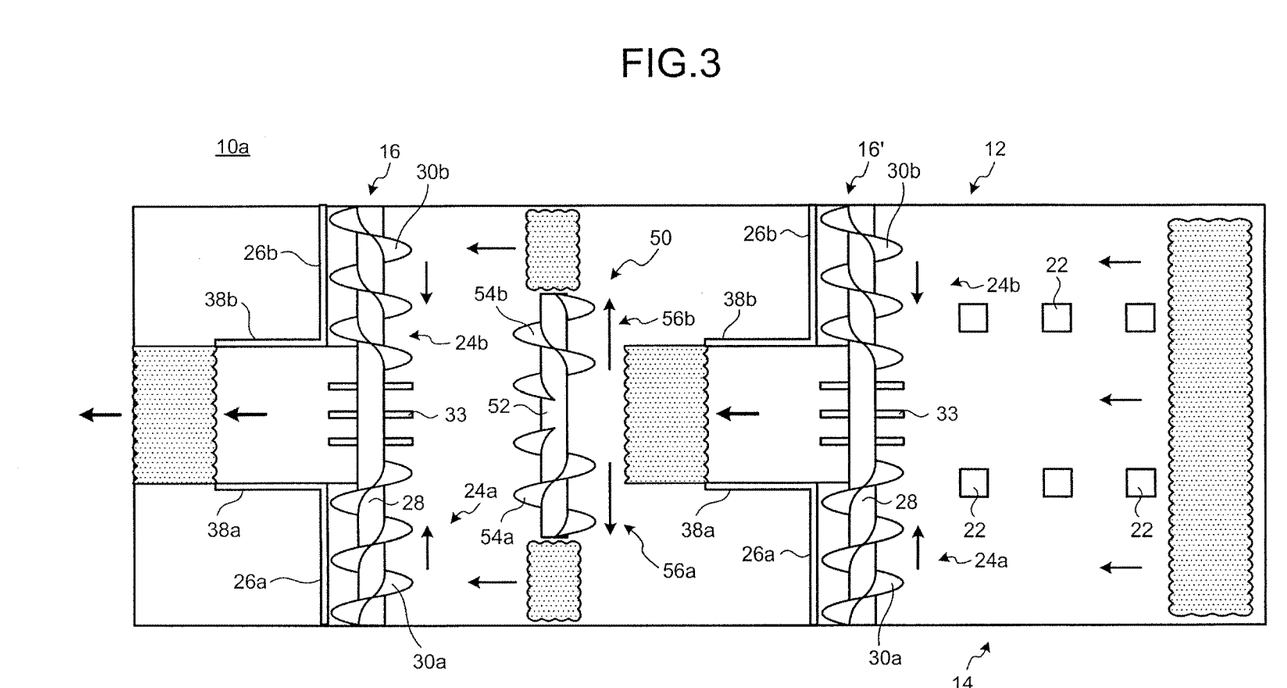
FIG. 3 is a plan view illustrating a configuration of a sludge condensing machine according to a second embodiment of the present invention.

FIG. 3 is a plan view illustrating the configuration of the sludge condensing machine 10a according to the second embodiment of the present invention. Further, as shown in FIG. 3, in the sludge condensing machine 10a according to the second embodiment, two movement mechanisms 16, 16' are provided. Since the second movement mechanism 16' is the same in structure to the first movement mechanism 16, the balance of the elements in the respective movement mechanisms 16, 16' have been depicted with the same reference numerals due to these elements having functions identical with or equivalent to those of the sludge condensing machine 10 according to the above-described first embodiment, thus avoiding a redundant detailed explanation in regards to the reference numerals in each of the movement mechanisms 16, 16'. This is applicable to each of embodiments as follows.

As illustrated in FIG. 3, the sludge condensing machine 10a is different from the sludge condensing machine 10 according to the above described first embodiment in that a plurality of movement mechanisms 16, 16' (two in FIG. 3) are arranged in series on an upper surface 12a of the filtration body 12 and a dispersion mechanism (screw conveyor) 50 is provided between the movement mechanisms 16, 16'.

The dispersion mechanism 50 includes a pair of screws 56a and 56b formed by providing spiral screw blades 54a and 54b on an outer periphery of a screw shaft 52. The screws 56a and 56b are provided in the vicinity of the center in the width direction of the filtration body 12. The directions of spirals of the respective screw blades 54a and 54b are symmetric (opposite) with respect to a center line of the filtration body 12, and the directions in which the sludges are moved by the screws 56a and 56b are set opposite to each other (both are directed outward in the width direction of the filtration body 12).

Therefore, in the sludge condensing machine 10a, when the sludge consolidated at the center by the movement mechanism 16 positioned in an upstream side is introduced to the dispersion mechanism 50, the screws 56a and 56b separate and move the sludge from an inside to outsides respectively in the width direction of the filtration body 12 in the dispersion mechanism 50. Therefore, the sludges separated and moved are conveyed by the travelling filtration body 12 to a downstream side via two outside portions, at which the screws 56a and 56b are not installed, introduced to the following movement mechanism 16, and moved to a center portion again to be consolidated.

As described above, since the sludge condensing machine 10a according to the present embodiment includes the dispersion mechanism 50 dispersing the sludge, collected by the movement mechanism 16, in the width direction of the filtration body 12, the sludge consolidated previously by the movement mechanism 16 can be dispersed again. Therefore, a further dehydration of the sludge is possible by dispersing again the sludge, of which concentration is promoted by consolidation, and an effect of compression by the screws 56a and 56b constituting the dispersion mechanism 50 can be obtained.

In addition, since the sludge condensing machine 10a is capable of consolidating the sludge, dispersed by the dispersion mechanism 50, again by the movement mechanism 16 at a rear stage, it is possible to increase the condensation concentration of the sludge furthermore. As long as the movement mechanisms 16 and the dispersion mechanisms 50 are arranged alternately, the number of the mechanisms can be modified appropriately, and it may be determined by considering the configuration of a digestion tank etc. at a rear stage as to which one of the movement mechanism 16 and the dispersion mechanism 50 should be disposed at the down most stream side of the gravity filtration section 14.

A sludge condensing machine 10b according to a third embodiment of the present invention will be explained next.

Figure 4:
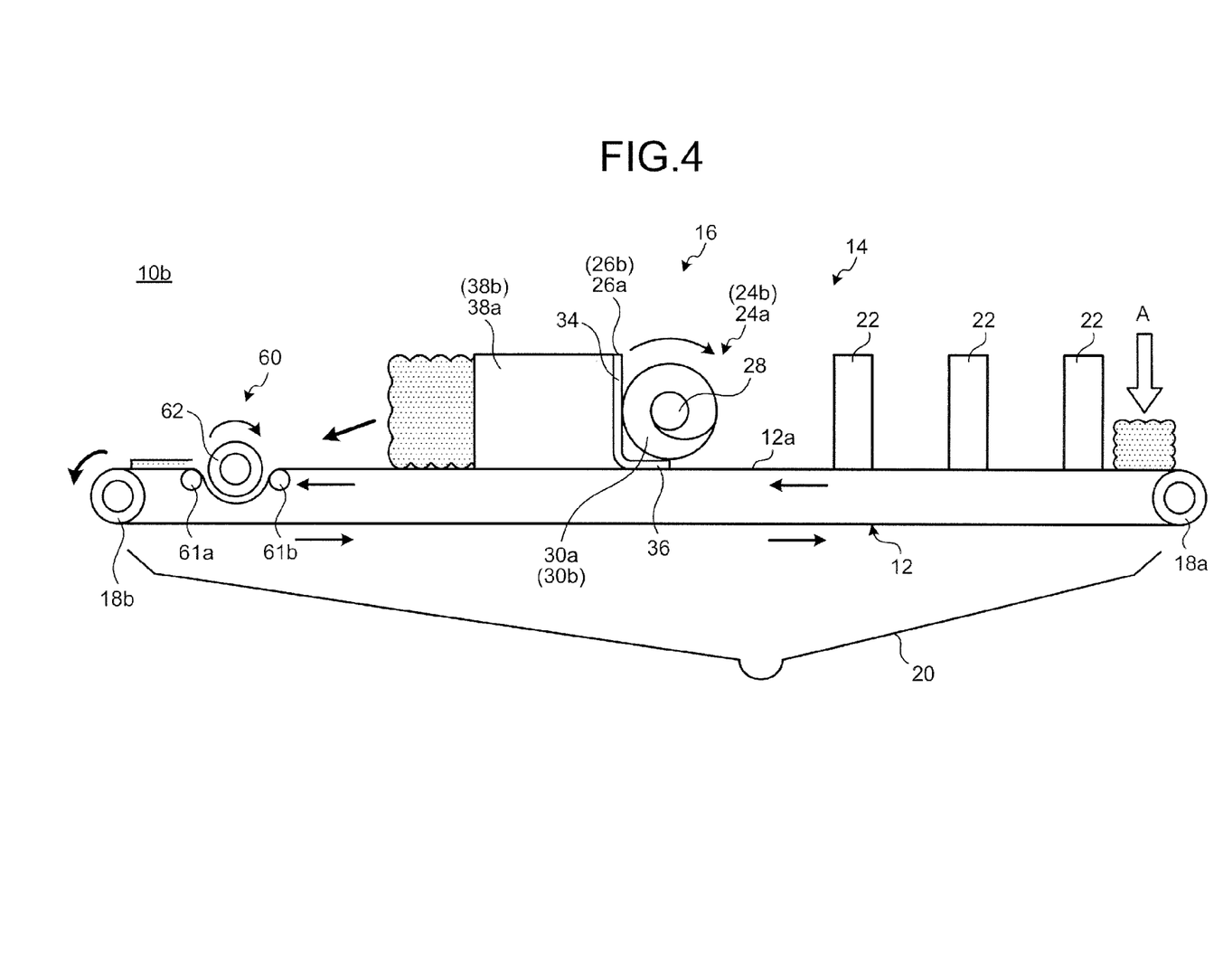
FIG. 4 is a side view illustrating a configuration of a sludge condensing machine according to a third embodiment of the present invention.

FIG. 4 is a side view illustrating the configuration of the sludge condensing machine 10b according to the third embodiment of the present invention. As illustrated in FIG. 4, the sludge condensing machine 10b is different from the sludge condensing machine 10 according to the above described first embodiment in that a pressure dehydration unit 60 conducting a pressure dehydration to a sludge is disposed at a downstream side of the movement mechanism 16 provided to the gravity filtration section 14 formed on the upper surface 12a of the filtration body 12.

The pressure dehydration unit 60 includes a pressure roller 62 pressing to deform the upper surface 12a of the filtration body 12 downwardly between small-diameter rollers 61a and 61b. The pressure dehydration unit 60 is configured as a roller press mechanism causing the sludge discharged from the movement mechanism 16 to be placed, pressed, and dehydrated between the pressure roller 62 and the filtration body 12.

Therefore, since the sludge having been consolidated and increased in height by the movement mechanism 16 is introduced to the pressure dehydration unit 60, a dehydration capability of the pressure dehydration unit 60 can be improved in the sludge condensing machine 10b better than in a case where a sludge extending in a width direction and being low in height immediately after being introduced to the sludge introduction position A is pressed and dehydrated. Therefore, a sludge can be furthermore dehydrated to be concentrated than in a configuration provided with the gravity filtration section 14 alone.

Figure 5:
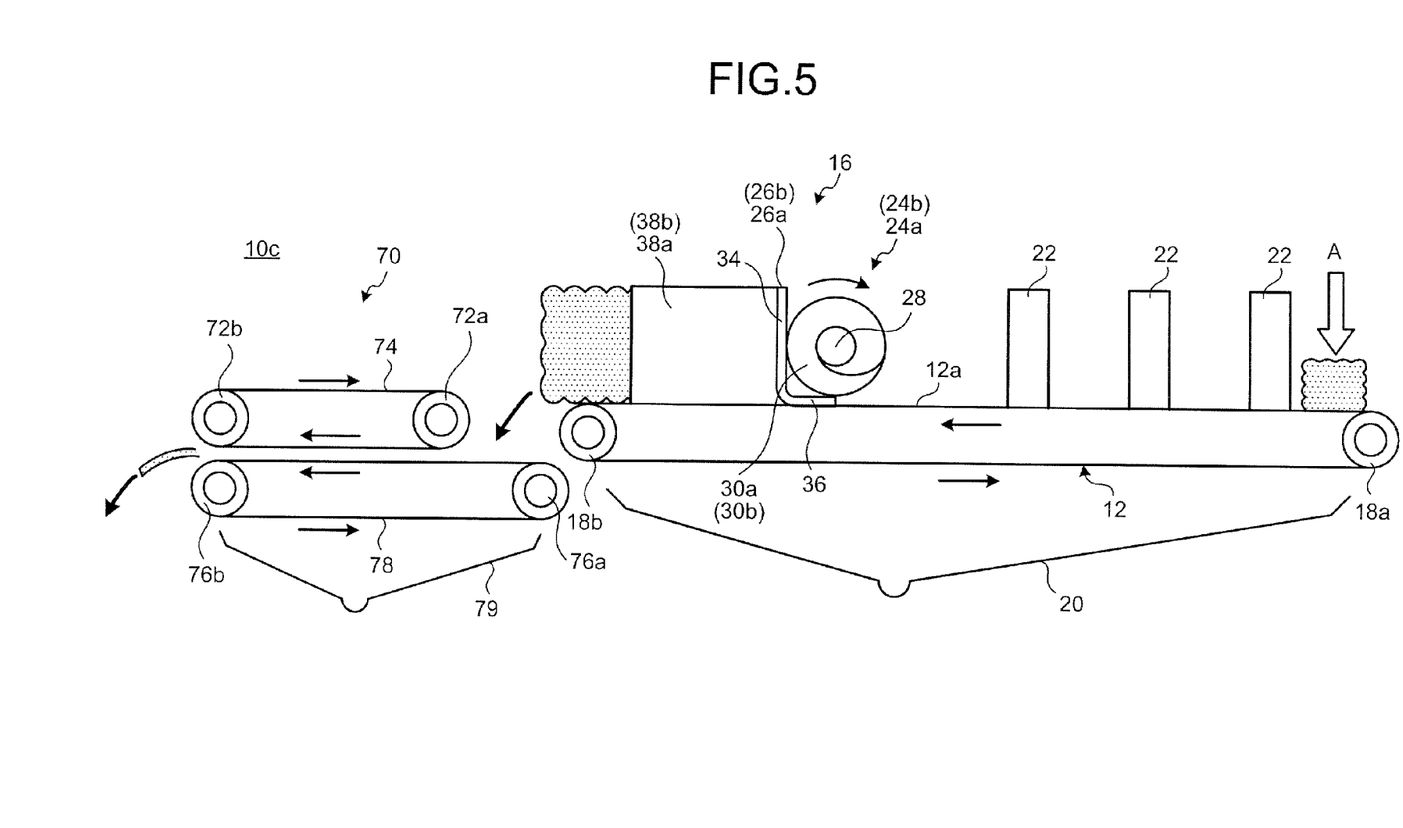
FIG. 5 is a side view illustrating a configuration of a sludge condensing machine according to a modification of the sludge condensing machine illustrated in FIG. 4.

The pressure dehydration unit provided at a downstream side of the movement mechanism 16 may be configured as other than the pressure dehydration unit 60 adapting the above described roller press mechanism. For example, it may be configured to provide a pressure dehydration unit 70 adapting a belt-press mechanism like the sludge condensing machine 10c illustrated in FIG. 5. As illustrated in FIG. 5, the pressure dehydration unit 70 includes a filtration body 74 wound between rollers 72a and 72b and a filtration body 78 wound between rollers 76a and 76b. A filtrate tray 79 is disposed below the pressure dehydration unit 70.

Therefore, since the sludge having been consolidated and increased in height by the movement mechanism 16 is introduced to the pressure dehydration unit 70, it is possible to improve a dehydration capability of the pressure dehydration unit 70 also in the sludge condensing machine 10c.

A sludge condensing machine 10d according to a forth embodiment of the present invention will be explained next.

Figure 6:
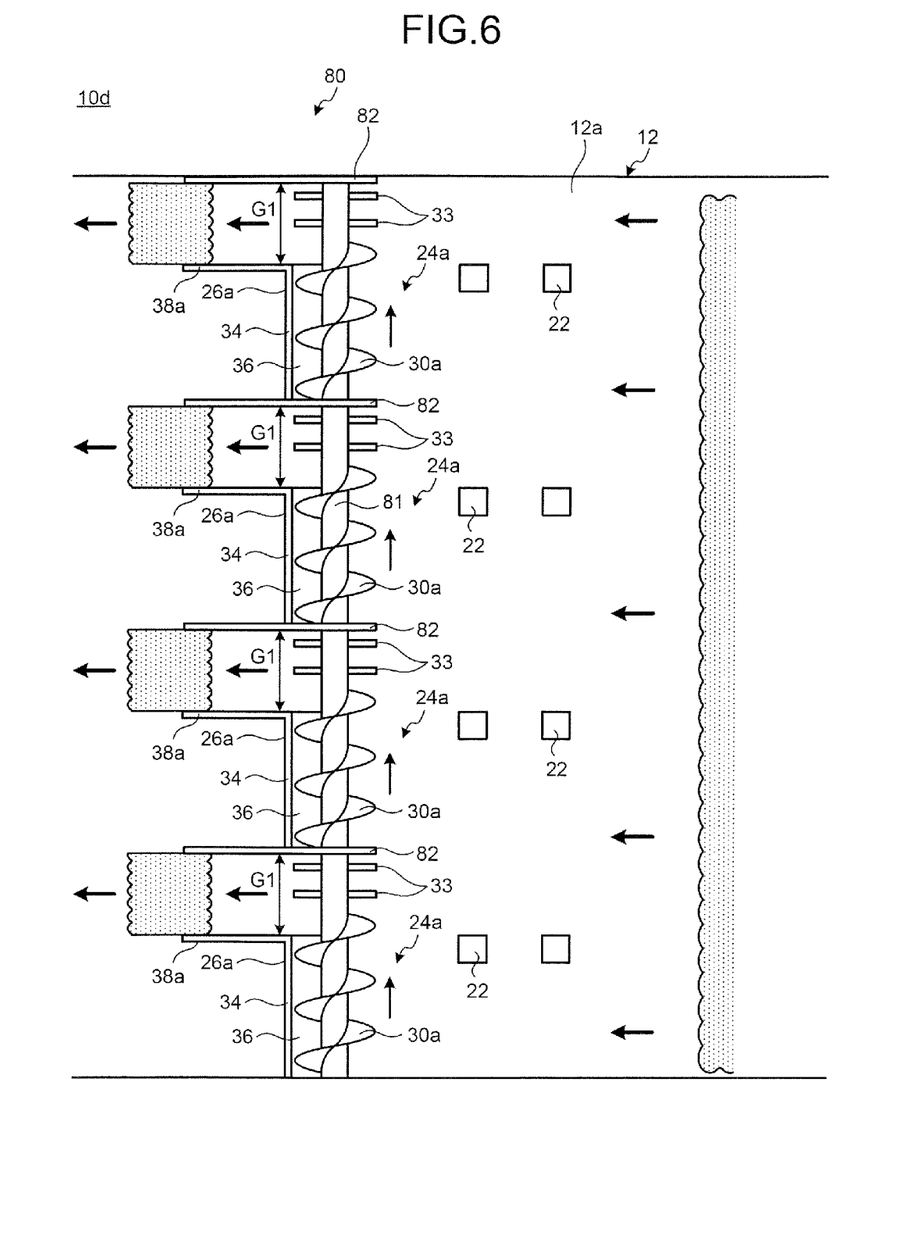
FIG. 6 is a plan view illustrating a configuration of a sludge condensing machine according to a fourth embodiment of the present invention.

FIG. 6 is a plan view illustrating the configuration of the sludge condensing machine 10d according to the fourth embodiment of the present invention. As illustrated in FIG. 6, the sludge condensing machine 10d is different from the sludge condensing machine 10 according to the above described first embodiment in that the sludge condensing machine 10d includes a movement mechanism (screw conveyor) 80 configured by arranging a plurality of unidirectional screws 24a (four screws in FIG. 6) constituting the movement mechanism 16 along the width direction of the filtration body 12.

The movement mechanism 80 has a thrust plate 82 standing in a state where a gap G1 is formed to cause a sludge pressed against the thrust plate 82 to pass between a top end side of each screw 24a provided on a piece of the screw shaft 81, i.e., a front side in a direction of the sludge moved by each screw 24a, and the thrust plate 82 to a downstream side.

Therefore, in the sludge condensing machine 10d, when the sludge conveyed on the upper surface 12a of the filtration body 12 is caught by each rotating screw 24a, the sludge is moved while being guided by a guide plate 26a and being pressed to one side (upwardly in FIG. 6). The sludge moved by the screw 24a is mixed with a sludge having been conveyed on a portion, where no screw 24a is formed (at an upstream side of the gap G1), and not having been caught by the screw 24a, and simultaneously, the mixed sludge is pressed against the thrust plate 82 by an extruding force of the screw 24a to be consolidated. The sludge consolidated, reduced in dimension in the width direction, and increased in height is discharged from the gap G1 to a downstream side through a path between the passage plate 38a and the thrust plate 82 by a rotating force of the paddle 33. During this occasion, a gravity filtering by the filtration body 12 continues to concentrate the sludge to a desirable condensation concentration.

As described above, since the thrust plate 82 stops the sludge moved by the screw 24a in the sludge condensing machine 10d and serves as a sludge-consolidating-and-compressing plate for promoting its consolidation and compression, it is possible to increase a condensation concentration of the sludge furthermore. In addition, since merely arranging a plurality of combinations of the screw 24a and the thrust plate 82 allows an amount of the sludge to be treated to be increased to a great extent, it is particularly effective if an apparatus greater in size is desired for increasing an amount of the sludge to be treated. Of course, the number of the combinations of the screw 24a and the thrust plate 82 can be modified appropriately, e.g., only one combination may be used.

It should be noted that the present invention is not limited by the embodiments described above and can be modified unrestrictively without departing from the spirit of the present invention.

For example, elements constituting the sludge condensing machines 10 and 10a to 10d respectively according to the above described embodiments may be add or exchanged with each other. For example, the pressure dehydration units 60 or 70 illustrated in FIG. 4 or 5 may be installed at a downstream side of the movement mechanism 16 disposed at a downstream side of the sludge condensing machine 10a illustrated in FIG. 3. These pressure dehydration units 60 and 70 may be installed at a downstream side of the movement mechanism 80 illustrated in FIG. 6. In addition, the dispersion mechanism 50 illustrated in FIG. 3 may be disposed at a downstream side of the movement mechanism 80 illustrated in FIG. 6.

Although the configuration adapting the screw conveyor method was exemplified for the movement mechanisms 16 and 80 or the dispersion mechanism 50 for moving the sludge in a direction intersecting the conveying direction of the sludge by the filtration body 12 in the above described embodiments, it may be a configuration other than the screw conveyor method, e.g., a configuration using a scraper-like movement mechanism.

According to one embodiment of the present invention, the sludge subjected to the gravity filtering while being conveyed on the filtration body is moved in a direction intersecting its conveying direction to be reduced in dimension in its width direction, and increases its height to be consolidated. Therefore, it is possible to concentrate the sludge efficiently and increase its condensation concentration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sludge condensing machine comprising:
   a gravity filtration section conducting a gravity filtering to a sludge while conveying the sludge on an upper surface of a filtration body; and
   a movement mechanism, disposed at a downstream side of a sludge insertion position of the gravity filtration section, for reducing a dimension of the sludge in a width direction on the filtration body by moving the sludge in a direction intersecting a conveying direction that the sludge is conveyed by the filtration body, wherein
   the movement mechanism has at least a screw extending in the direction intersecting the conveying direction of the sludge by the filtration body, and the sludge is moved by a rotation of the screw,
   a plurality of guide plates for guiding the sludge moved by the screw stands at a downstream side of and in proximity of the screw in the conveying direction of the sludge,
   the plurality of guide plates extends in the direction intersecting the conveying direction to block the sludge and introduce the sludge to the screw,
   an end of each of the plurality of guide plates is connected to an end of a passage plate that extends along the conveying direction, such that the gravity filtration section is configured to convey the sludge introduced by the guide plate along the passage plate in the conveying direction,
   the screw includes a screw shaft, which extends in the direction intersecting the conveying direction, and a plurality of screw blades that are provided on an outer periphery of the screw shaft, the screw blades are separated from each other in the direction intersecting the conveying direction,
   the plurality of guide plates are provided overlapping the position of the screw blades at a downstream side of the screw in the conveying direction, the guide plates are separated from each other by a gap at a position between the screw blades that are separated,
   a plurality of passage plates are provided extending from end portions of the guide plates at opposite sides of the gap in a downstream direction of the conveying direction, and the passage plates are separated from each other by the gap,
   wherein each guide plate further comprises a wall portion and a bottom portion, and the bottom portion of the guide plate is formed by bending a lower end of the wall portion so as to protrude under the screw and a screw blade, wherein the bottom portion of the guide plate protrudes toward an upstream side of the screw that has a center, such that an upper surface of the bottom portion of the guide plate is positioned under the screw, and
   wherein the bottom portion of each guide plate that overlaps the screw blade is bent so as to extend in a direction perpendicular to a height of the wall portion, with the bottom portion of each guide plate protruding towards an upstream side of the screw blade, which has a radial diameter, such that the bottom portion of the guide plate has an upstream edge that is positioned below a lowermost point of the radial diameter of each screw blade.

2. The sludge condensing machine according to claim 1, further comprising a thrust plate which stands at a front side in a direction of the sludge moved by the screw in a manner to form a gap, toward a top end of the screw, to allow passage of the sludge to a downstream side and against which the sludge, moved by the screw, is pressed, wherein the thrust plate extends along the conveying direction.

3. The sludge condensing machine according to claim 2, wherein a plurality of combinations of the screw and the thrust plate are arranged along the width direction on the filtration body.

4. The sludge condensing machine according to claim 1, further comprising a pressure dehydration unit conducting a pressure dehydration to the sludge discharged from the movement mechanism.

5. The sludge condensing machine according to claim 1, further comprising a chemical-feeding facility disposed at an upstream side of the movement mechanism in the gravity filtration section for feeding a flocculant to the sludge being conveyed on the filtration body.

6. The sludge condensing machine according to claim 1, wherein the guide plates extend in a direction perpendicular to the conveying direction.

7. The sludge condensing machine according to claim 1, wherein,
   the movement mechanism includes a first movement mechanism and a second movement mechanism that is positioned at a downstream side of the first movement mechanism, the first movement mechanism and the second movement mechanism each have a screw having a plurality of screw blades that are provided on an outer periphery of a screw shaft, the screw blades extend with a spiral shape along a center axis of the screw is an extending direction of the screw shaft, wherein,
   a middle screw is provided between the first movement mechanism and the second movement mechanism, the middle screw includes a middle screw shaft which extends in the direction intersecting the conveying direction and the middle screw having a blade which extends with a spiral shape along a center axis of the middle screw in an extending direction of the middle screw shaft, the middle screw is configured to move the sludge, by a rotation of the middle screw shaft, to a direction opposite to a direction to which the screw of the first movement mechanism and the screw of the second movement mechanism move the sludge.

8. The sludge condensing machine according to claim 1, wherein,
   the screw includes a paddle, wherein,
   the screw blades extend with a spiral shape and a center axis of the screw blade is an extending direction of the screw shaft, such that the screw blades are inclined in the extending direction of the screw shaft,
   the paddle is provided at a position between the screw blades on the outer periphery of the screw shaft, the paddle extends along a direction perpendicular to the extending direction of the screw shaft towards an outer radial direction of the screw shaft, and the paddle extends along the conveying direction.

\* \* \* \* \*